J. K. McCULLAGH.
AUTOMOBILE LAMP AND LICENSE PLATE HOLDER.
APPLICATION FILED MAY 26, 1921.
Patented Oct. 18, 1921.
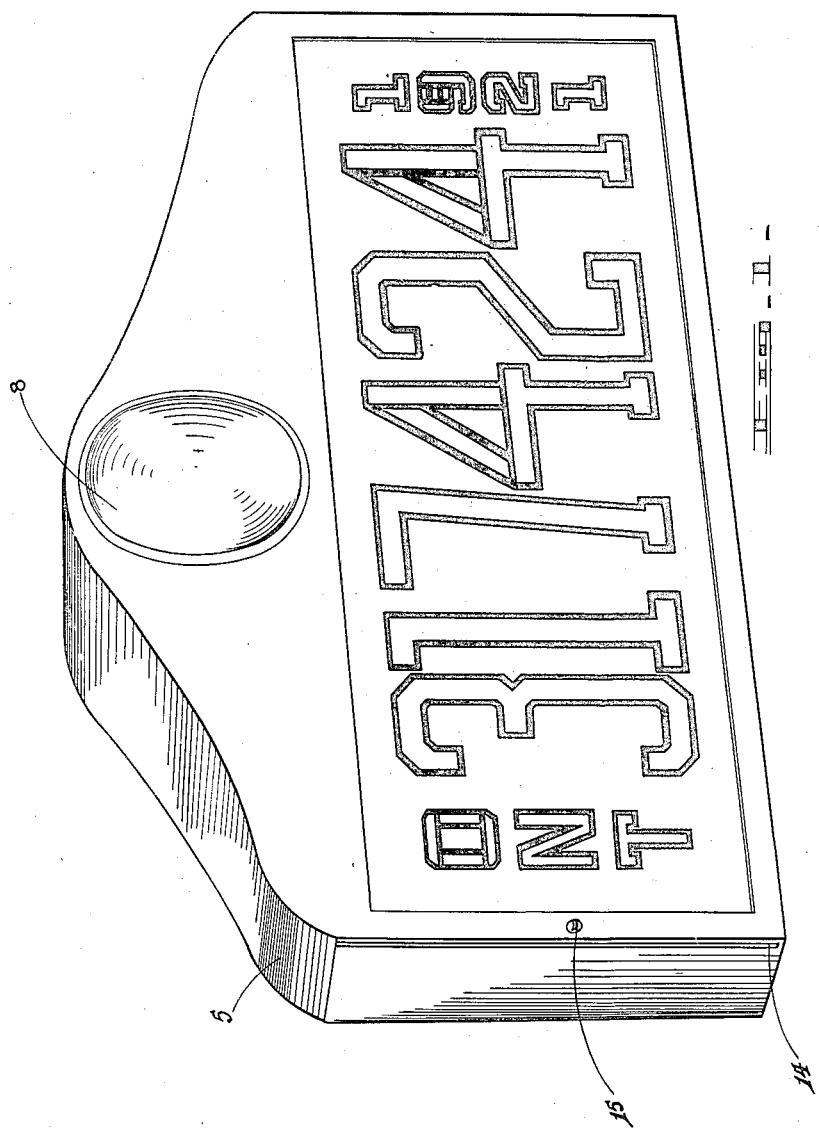
INVENTOR.
J. K. McCULLAGH.
BY
ATTORNEY.

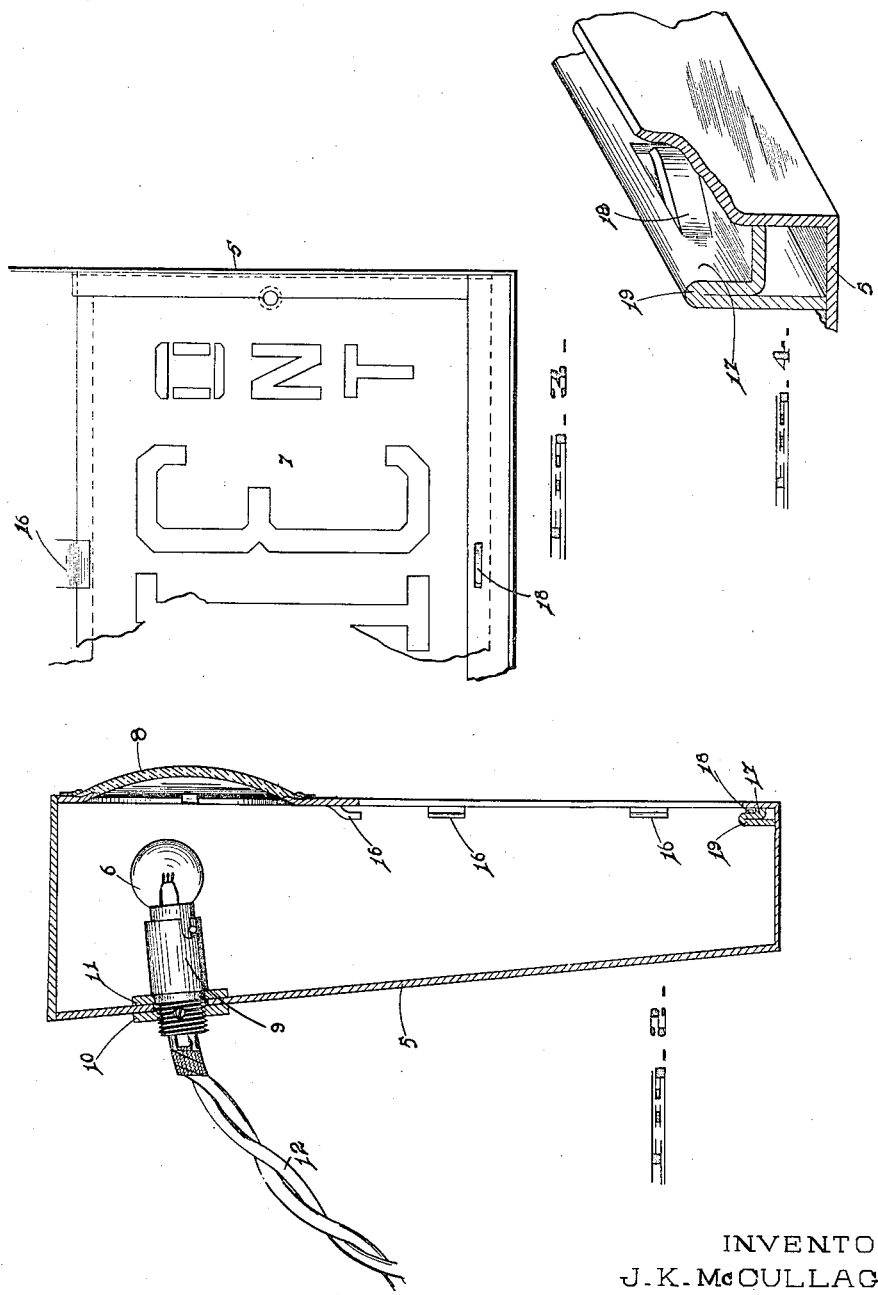

UNITED STATES PATENT OFFICE.

JOHN K. McCULLAGH, OF TORONTO, ONTARIO, CANADA.

AUTOMOBILE LAMP AND LICENSE-PLATE HOLDER.

1,394,517.   Specification of Letters Patent.   Patented Oct. 18, 1921.

Application filed May 26, 1921. Serial No. 472,752.

*To all whom it may concern:*

Be it known that I, JOHN K. McCULLAGH, a citizen of the Dominion of Canada, residing at Toronto, in the county of York and Province of Ontario, Canada, have invented certain new and useful Improvements in Automobile Lamp and License-Plate Holders, of which the following is a specification.

The present invention relates to improvements in motor vehicle license plates positioned at the rear of the motor vehicle. The principal object is to position the tail light of the said motor vehicle in a suitable housing in relation with a license plate so that the license number of the vehicle may be read at a considerable distance with little difficulty.

With these and other objects in view, the invention consists in the construction, combination and arrangement of parts as will be hereinafter fully described, illustrated in the accompanying drawings and pointed out in the claims hereunto appended.

Figure 1 is a perspective view illustrating the embodiment of my present invention.

Fig. 2 is a transverse vertical section of the same.

Fig. 3 is a fragmentary detail illustrating the construction of the license plate and the means of holding the same in position.

Fig. 4 is a fragmentary perspective view illustrating one of the members functioned to hold the license plate in its proper position.

Referring to the drawings, like numerals designate like parts in the various drawings.

The numeral 5 indicates the outer casing which supports the tail light 6 and the license plate 7. The numeral 8 indicates a lens positioned in the upper front portion of the housing 5 as indicated diagrammatically and may be of any suitable color to conform with Government requirements. The tail light 6 is positioned in the socket 9 which is suitably insulated by the insulators 10 and 11. The numeral 12 indicates wires leading to the batteries from whence the tail light is illuminated. The license plate indicated by the numeral 7 will be configurated to conform with Government regulations, the indicating numerals and letters on the same being cut from the license plate and having their outer edge suitably colored in relation to the license plate. The interior of the housing 5 will be colored to conform with the color desired for the indicating numerals and letters of the license plate 7. A vertical slot 14 is positioned in the end of the housing as indicated diagrammatically in Fig. 1. When it is desired to place the license plate in position the same is passed through the slot 14 and when in position is held from displacement by the set screw 15. Lug members 16 are stamped up from the housing member 5 and adapted to hold the license plate in position. A longitudinal groove indicated by the numeral 17 is suitably positioned on the lower front edge of the housing adapted for reception of the license plate. Lugs 18 are stamped inwardly from the wall 19 forming the longitudinal groove 17, the said lugs being functioned to tension against the license plate 7 and assist in retaining the same.

It is obvious that the tail light having its inner wall slanting inwardly toward the bottom, will illuminate lens 8 and the light will diffuse through the openings forming the indicating numerals and letters and that the said tail light will illuminate more efficiently the license plate than the method now in vogue.

What I claim as new is:

A device of the character stated, comprising a housing, a lens positioned therein, means to illuminate said lens, a license plate positioned in the front wall of said housing, and a longitudinal member within the housing at the bottom thereof, having a longitudinal groove to receive said license plate and outwardly extended tensioning lug members stamped from the vertical wall of said member to engage and resiliently press said license plate against the inner face of the wall of the housing.

In testimony whereof I affix my signature in the presence of two witnesses.

JOHN K. McCULLAGH.

Witnesses:
 JOHN LATIMER,
 MAUD HOPES.